(12) United States Patent
Levinshtein et al.

(10) Patent No.: US 9,098,520 B2
(45) Date of Patent: Aug. 4, 2015

(54) APPARATUS AND METHODS FOR RESTORING DATA OBJECTS

(71) Applicants: Shahar Levinshtein, Givataim (IL); Alexander Hochner, Tel Aviv (IL)

(72) Inventors: Shahar Levinshtein, Givataim (IL); Alexander Hochner, Tel Aviv (IL)

(73) Assignee: BALOOTA APPLICATIONS LTD., Tel Aviv (IL)

( * ) Notice: Subject to any disclaimer, the term of this patent is extended or adjusted under 35 U.S.C. 154(b) by 79 days.

(21) Appl. No.: 13/745,802

(22) Filed: Jan. 20, 2013

(65) Prior Publication Data

US 2013/0262395 A1 Oct. 3, 2013

Related U.S. Application Data

(60) Provisional application No. 61/619,441, filed on Apr. 3, 2012.

(51) Int. Cl.
*G06F 17/30* (2006.01)

(52) U.S. Cl.
CPC .... *G06F 17/30117* (2013.01); *G06F 17/30097* (2013.01); *G06F 17/30115* (2013.01)

(58) Field of Classification Search
CPC ............... G06F 17/30117; G06F 17/30091
See application file for complete search history.

(56) References Cited

U.S. PATENT DOCUMENTS

| | | | |
|---|---|---|---|
| 5,390,318 A * | 2/1995 | Ramakrishnan et al. ..... | 711/158 |
| 6,151,643 A * | 11/2000 | Cheng et al. ................... | 710/36 |
| 6,615,224 B1 | 9/2003 | Davis | |
| 7,523,149 B1 * | 4/2009 | Sridharan et al. ..................... | 1/1 |
| 7,921,082 B2 | 4/2011 | Mukker | |
| 2005/0010671 A1 * | 1/2005 | Grannan ........................ | 709/229 |
| 2005/0120063 A1 * | 6/2005 | Koestler ........................ | 707/204 |
| 2006/0095470 A1 * | 5/2006 | Cochran et al. ............ | 707/104.1 |
| 2007/0244867 A1 * | 10/2007 | Malandain et al. ............... | 707/3 |
| 2013/0166819 A1 * | 6/2013 | Yerushalmi et al. .......... | 711/103 |

FOREIGN PATENT DOCUMENTS

| | | |
|---|---|---|
| CN | 101287190 | 10/2008 |
| CN | 2007144127 | 1/2009 |

OTHER PUBLICATIONS

Allen, Hard links and Unix file system nodes (inodes), 2004.*
Cprogramming.com C File IO and Binary File IO, 2011.*
Eager, A tutorial on the FAT file system, 2010.*
Superuser.com, Is it better to always copy and delete, rather than move, 2010.*
Internet technical forums post: http://www.androidtablets.net/forum/asus-tf101-sl101-forum/28593-there-recyclebin.html.

(Continued)

*Primary Examiner* — William Spieler
(74) *Attorney, Agent, or Firm* — Edward Langer

(57) ABSTRACT

The subject matter discloses a method for handling a data object. The method comprises the steps of storing a pointer to a physical location of the data object in a first data repository; associating, in the first data repository, the pointer with a logical location of the data object; receiving an event indicating a blocking of a user access to the data object; retrieving the pointer from the first data repository as a result of the receiving of the event; accessing the physical location by using the retrieved pointer; and copying the data object from the physical location to a second data repository, thereby enabling the restoring of said data object.

4 Claims, 16 Drawing Sheets

(56) References Cited

OTHER PUBLICATIONS

Internet technical forums post: http://www.androidtablets.net/forum/new-member-introduction-site-assistance/22739-where-recycle-bin-how-retreive-accidently-deleted-items.html.

Internet technical forums post: http://androidforums.com/evo-4g-support-troubleshooting/324924-recycle-bin.html.

Internet technical forums post: http://forum.xda-developers.com/showthread.php?t=979121.

* cited by examiner

APPARATUS AND METHODS FOR RESTORING DATA OBJECTS

BACKGROUND

In computing, the recycle bin is a temporary data repository for files that have been deleted by the user, but not yet permanently erased from the physical media. Typically, a recycle bin is presented to the user as a special folder (whether or not it is actually a single folder depends on the implementation), allowing the user to browse deleted files, undelete those that were deleted by mistake, or delete them permanently (either one by one, or by the "Empty Trash" function).

Within a recycle bin folder, a record is kept for each file and/or folder's original location. On certain operating systems, files must be moved from the trash folder before they can be accessed again.

U.S. Pat. No. 7,921,082 to Atul Mukker discloses Methods and systems for recovering data utilize a command line interface of a data-processing system, run by an operating system such as Linux, Unix, DOS, Windows, Mac and the like, to recover and manage inadvertently deleted data. Desired data such as files, folders, and the like can be initially identified from a command line interface. The desired data can then be automatically saved in a memory location of the data-processing system, in response to identifying the desired data from the command line interface. The data can then be automatically recovered from the memory location of the data-processing system for display within the command line interface, if the desired data is inadvertently deleted. Additionally, a user can be permitted to specify a plurality of recycling rules presented through a graphical user interface dialog or other graphical user interface device.

BRIEF SUMMARY

One exemplary embodiment of the disclosed subject matter is a method for handling a data object; the method comprises the steps of: storing a pointer to a physical location of the data object in a first data repository; associating, in the first data repository, the pointer with a logical location of the data object; receiving an event indicating a blocking of a user access to the data object; retrieving the pointer from the first data repository as a result of the receiving the event; accessing the physical location by using the retrieved pointer; and copying the data object from the physical location to a second data repository; thereby enabling the restoring of the data object. According to some embodiments, the step of obtaining the pointer to the physical location further comprises the step of executing a function of an application programming interface (API). According to some embodiments the API function comprises an open function. According to some embodiments the method, further comprises the step of identifying a type of the data object prior to the step of storing the pointer and wherein the step of storing the pointer is if the type of the data object is a protected data object. According to some embodiments, the method further comprises the step of restoring the data object from the second data repository. According to some embodiments the second data repository is a recycle bin. According to some embodiments the copying of the data object to the second data repository is substantially instantly after the receiving the event. According to some embodiments the data object is a file. According to some embodiments the blocking comprises one member of a group consisting of deleting, moving and renaming. According to some embodiments the method further comprises the step of associating, in the second data repository, the pointer with the logical location of the data object.

One other exemplary embodiment of the disclosed subject matter is a method for handling a data object; the method comprises the steps of: storing a pointer to a physical location of the data object in a first data repository; associating, in the first data repository, the pointer with a logical location of the data object; receiving an event indicating a blocking of a user access to the data object; retrieving the pointer from the first data repository as a result of the receiving the event; copying the data object from the physical location to a second data repository; accessing the physical location by using the retrieved pointer; and associating, in the second data repository, the pointer with the logical location of the data object; thereby enabling the restoring of the data object.

One other exemplary embodiment of the disclosed subject matter is a method for handling a data object. The method comprises the steps of executing an application programming interface (API) function for obtaining a pointer to a physical location of the data object; storing the pointer in a first data repository; associating, in the first data repository, the pointer with a logical location of the data object; receiving an event indicating a blocking of a user access to the data object; retrieving the pointer from the first data repository as a result of receiving the event; copying the data object from the physical location to a second data repository; accessing the physical location by using the retrieved pointer; and associating, in the second data repository, the pointer with the logical location of the data object; thereby enabling the restoring of the data object.

According to some embodiments the function of the application programming interface comprises an open function.

One other exemplary embodiment of the disclosed subject matter is an apparatus for handling a data object; the apparatus comprises: a first data repository (120); a second data repository (150); a first module (160); and a second module (140); wherein the first module (160) is configured for storing a pointer to a physical location of the data object in a first data repository (120); for associating, in the first data repository, the pointer with the logical location of the data object; for receiving an event indicating a blocking of a user access to the data object and for activating the second module (140) as a result of receiving the event; and a second module (140) configured for accessing the data object via the pointer retrieved from the first data repository and for copying the data object from the physical location to a second data repository and for associating, in the second data repository, the pointer with the logical location of the data object; thereby enabling the restoring of the data object thereby enabling the restoring of the data object.

According to some embodiments the first module (160) is further configured for executing a function of an application programming interface (API) for obtaining the pointer to the physical location. According to some other embodiments the API function comprises an open function. According to some other embodiments the first module (160) is further configured for identifying a type of the data object prior to the step of storing the pointer and wherein the step of storing the pointer is if the type of the data object is a protected data object. According to some embodiments the first module (160) is further configured for restoring the data object from the second data repository (150); According to some embodiments the second data repository (150) is a recycle bin.

One other exemplary embodiment of the disclosed subject matter is a method for handling a data object; the method comprises the steps of: copying a content of the data object from a first data repository to a record in a second data repository; associating in the record the content of the data object in the second data repository with a logical location of the data object; receiving an event indicating a blocking of a user access to the data object; and linking the record to a recycle bin, as a result of the receiving the event; thereby enabling the restoring the data object.

According to some embodiments the method further comprises the step of restoring the content of the data object from the second data repository to the logical location in the first data repository.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
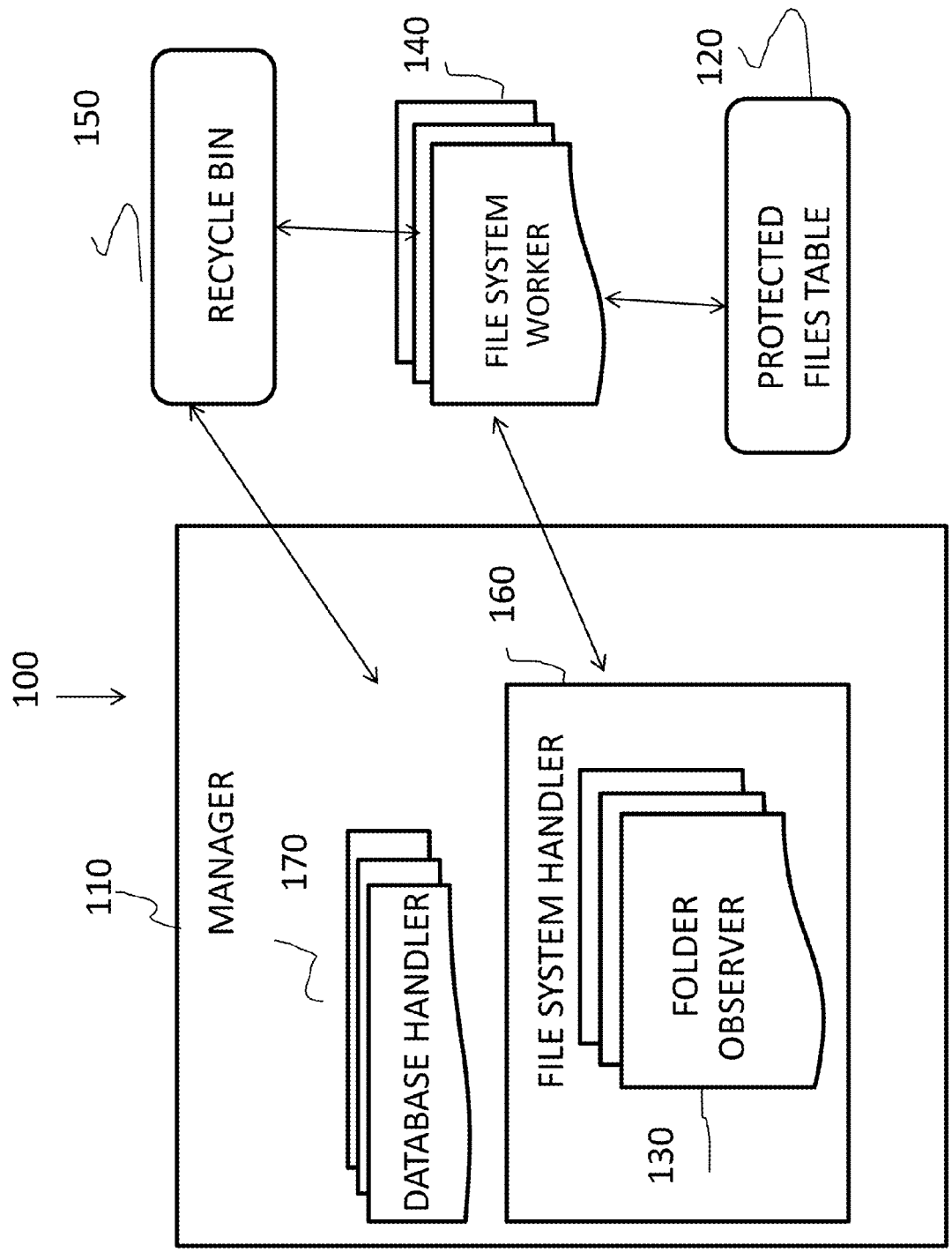
FIG. 1 shows a block diagram of a system for handling data objects, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The term data object refers herein to any object that is handled by a computerized application and/or by an operating system and is stored in storage of a computerized device. Such an object may be, for example, a file or a database item. Such a file can be, for example, a text file, browser bookmarks, an email message, a system settings file, a task and the like. Such a database item can be, for example, an SMS message, an MMS message, phone calls history log, browser bookmarks, specific system settings, an email message, an audio playlist and the like.

The term logical location refers herein to the logical reference that is used by a user to access a file, for example, when using application programming interface (API) functions. The logical location identifies the file. In some cases, the logical location includes the path name and the name of the file.

The term blocked data object refers herein to data object that is blocked for accessing by a user via the operating system interface or via the application interface. In some embodiments, the blocked data object is an object that has been deleted. In some other embodiments, the blocked data object is a data object that has been moved or renamed. In some embodiments, such data objects still exist in their physical location but cannot be accessed by a user, typically due to a change in a status of these data objects. The term blocking a data object refers to the operation of causing a data object to change status to blocked data object.

The terms restore refers herein to enabling a user to access the data object via the logical location after it has been blocked.

The terms protected data object, protected folder and protected file refer herein to any data object, folder or file that is configured by the user as a data object that requires protecting. By protecting is meant enabling the restoring of the data object after it has been blocked.

The terms recycle bin and dumpster are used herein interchangeably.

The term hard link refers herein to an object that associates a name with a physical location of the file on a file system. The hard link provides the ability to use multiple names for the same file. In some cases the hard link includes a directory that associates names of the file with the physical location of the file. Thus, if the file is opened by one of its names and changes are made to its content, then these changes are also visible when the file is opened by an alternative name. The hard link is typically supported by POSIX-compliant and partially POSIX-compliant operating systems, such as GNU/Linux, Android, Apple's Mac OS X, Windows NT4 and later Windows NT operating systems. Support also depends on the type of file system being used. For instance, the NTFS file system supports hard links, while FAT does not.

According to some embodiments there is provided a system and methods for restoring blocked data objects. In some embodiments, a recycle bin is used for storing the blocked data objects. When the blocked data object is a file it is typically resorted to the original logical location.

Such embodiments can be used when the operating system and its accompanied tools does not provide the restoring service; for example, when using Google Android, Nokia Simbian, Rims blackberry and the like. Such embodiments can be used when the application does not provide the restoring service; for example for restoring SMS or MMS messages.

Such embodiments can provide a generic solution to the restoring. Such a solution is not dependent on an operation system or on an application and is based on standard access to the operating system and/or to the application. In some embodiments the standard access includes Application Programming Interface (API) functions.

One technical problem dealt with by the present disclosure is to be able to restore blocked data objects where the operating system does not provide such a solution. In some cases, typically when using smart phones, the operating system does not provide a mechanism such as a recycle bin for restoring blocked data objects.

One other technical problem is to be able to restore the data object after the blocking operation has already been performed.

One technical solution is to retrieve and save a pointer to the physical location of a file after the file has been created; to identify events of blocking the data object and to copy the file and the data to a recycle bin when identifying that the file is blocked. In some embodiments the pointer to the physical location of the file is retrieved by performing an application program interface function (API) related to the file. In some embodiments the API function is an open function. In some other embodiments the pointer to the physical location of the file is retrieved by creating a hard link to the file. In some embodiments the identification of the blocking events and the copying of the file and the data to the recycle bin are performed in real time; thus ensuring that the pointer to the file is valid. In some embodiments, when the system does not have enough resources for opening all the files of the computerized device, a process of prioritizing the service of opening the files is implemented. In some embodiments the process is implemented by a queue mechanism. In some embodiments the recently used files are handled first. The process is described in greater details in FIGS. 14A and 14B.

One other technical solution is to read the data object from the database in which it was stored; to copy the data object to a mirror data object; to detect an event of a change in the data object; to compare the data object to the mirror data object as a result of the detection; to update the mirror data object as a result of a change detected to the data object in the comparing process and to copy the mirror data object to a recycle bin as a result of detecting that the data object has been deleted.

One other technical problem is to uniquely identify a data object in the recycle bin. In some cases a first data object which is assigned with a first logical location is blocked and a second data object is created and is assigned with the same logical location. In such a case, when the second data object is blocked, the recycle bin may include two data objects with the same logical location. For example, if a first file named file1.txt is deleted and copied to the recycle bin and a second file also named file1.txt is created and then deleted and copied to the recycle bin. The recycle bin may have two files that cannot be distinguished.

One technical solution is to assign a unique identification to a file before copying the file to the recycle bin. In some embodiment the unique identification is Universal Unique Identification (UUID). Thus two or more data objects can be stored in the recycle bin with the same logical location (e.g. the same file name) but with a different UUID.

Referring now to FIG. 1 showing a block diagram of a system for storing data objects, in accordance with some exemplary embodiments of the subject matter.

System 100 comprises a manager 110, one or more database handlers 170, a file system handler 160, one or more folder observers 130, a recycle bin 150, one or more file system workers 140 and a protected files table 120.

The manager 110 generates the file system handler 160 and the database handlers 170. In some embodiments the manager is a process.

The file system handler 160 handles data objects that are typically located on the file systems. In some embodiments the file system handler is a thread. In some embodiments the file system handler 160 initiates a recursive scan on each protected folder upon initialization. For example, if the device is a smart-phone, the file system handler 160 may scan all the folders on the SD card of the smart-phone and all the files that are included in the folders. During the initialization recursive scan, per each protected folder, the file system handler 160 generates a folder observer 130 and keeps the pointer to the folder observer 130 in a folder observers list (not shown). In addition, the file system handler 160 sends an open action on each protected file to the file system workers 140.

The folder observer 130 is an object of the file system handler. Each folder observer 130 is responsible for monitoring a specific folder. The folder observer 130 invokes methods of the file system handler 160. At run time, the folder observer 130 receives events related to the folder and to files in the folder and invokes the appropriate methods of the file system handler 160. Examples of such events may be folder deleted, file blocked, moved or new file added. The operation of the folder observer 130 is explained in greater details in FIG. 4.

The file system workers 140 are generated by the file system handler 160. Each of the file system workers 140 is responsible for handling the files that are assigned to the worker 140. In some embodiments a single worker 140 can handle only a limited number of files; thus, the file system handler 160 creates a new worker 140 whenever the number of files that are handled by the existing file system workers 140 exceeds a threshold. Each of the file system workers 140 is responsible for copying the file to a recycle bin 150 when the data object is blocked. The operation of the file system workers 140 is explained in greater details in FIG. 5. In some embodiments the file system worker 140 is a process of an operating system. For example, the worker may be a Linux process.

The one or more database handlers 170 handle data items that are stored in the database. In some embodiments the one or more database handlers 170 may be an SMS handler, an MMS handler, a contacts handler and the like or a combination thereof. The one or more database handlers 160 read the data objects from the database in which they are stored; copy the data objects to a mirror database which contains the data objects; detects an event of a change in any of the data object; compares the data object to the mirror data object as a result of the detection; updates the mirror data object as a result of a change detected in the data object during the comparing process and copies the mirror data object to a recycle bin as a result of detecting that the data object has been blocked deleted. In some embodiments, instead of moving the whole data item to the recycle bin, a deleting indication is added to the mirror data item; thus enabling to display the deleted data items in the recycle bin. For example, when a contact is updated by a user, the contacts handler identifies the change and updates the mirror contacts database. When a contact is deleted by a user the contacts handler copies the contact to the recycle bin 150.

Figure 2A:
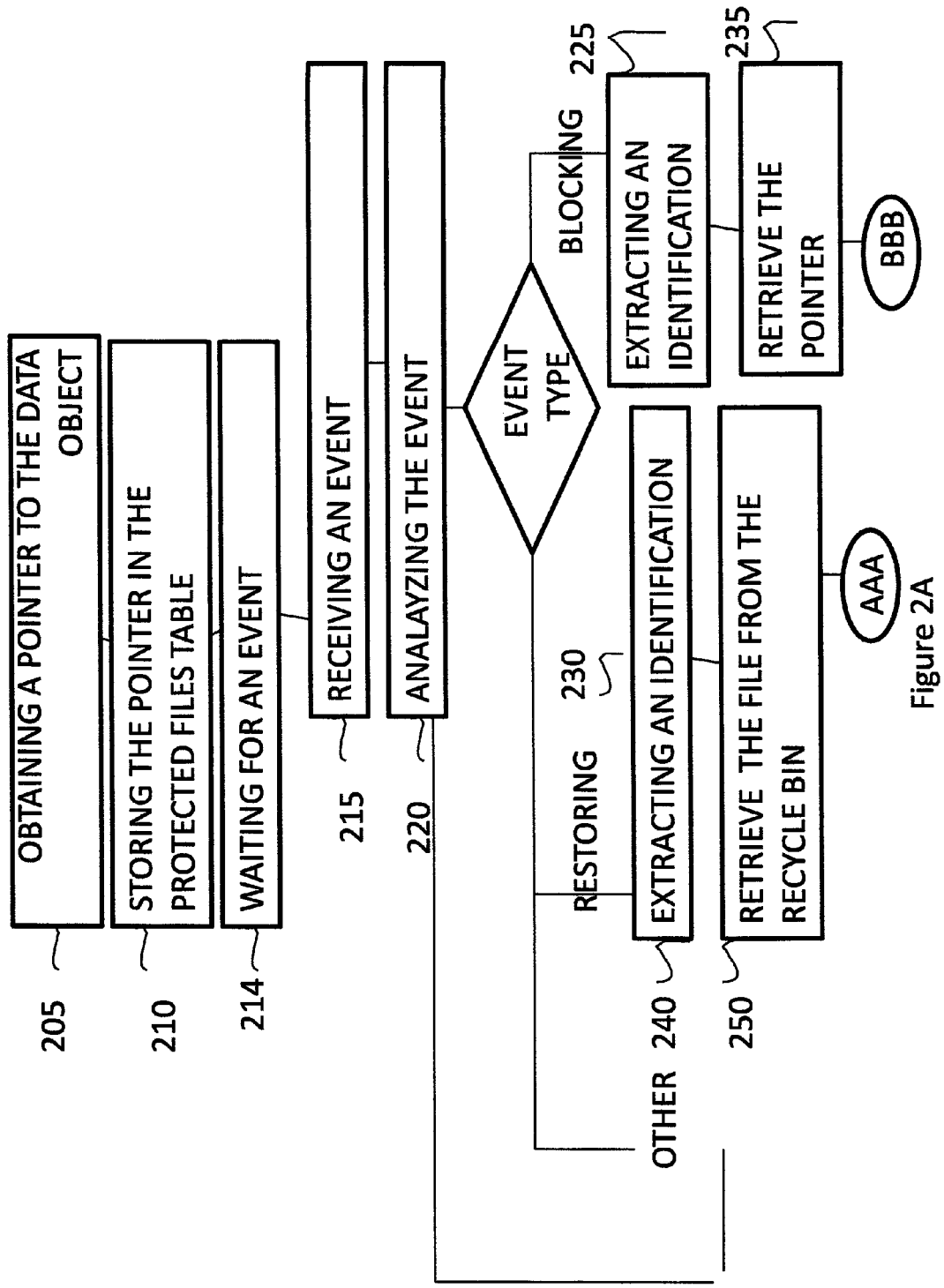
FIGS. 2A and 2B show a flowchart diagram of a method for handling a file, in accordance with some exemplary embodiments of the disclosed subject matter.
Figure 2B:
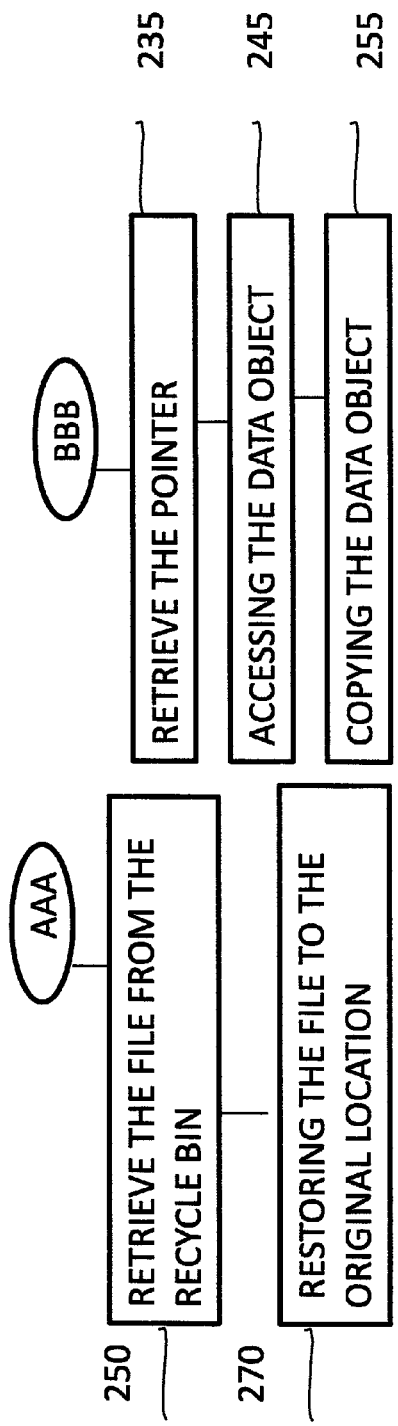

FIGS. 2A and 2B show a flowchart diagram of a method for handling a file, in accordance with some exemplary embodiments of the disclosed subject matter. According to some embodiments there is provided a method for storing file that is blocked by the system or by the operating system and for restoring the file upon user request. The method stores a pointer to the physical location of the file and then uses this pointer for copying the file to a recycle bin. In some embodiments only protected files are handled.

Steps 205 and 210 are performed at initialization or when a new file is detected.

At 205, a pointer to the file is obtained. In some cases the pointer is obtained by executing a function of an application programming interface (API). In some cases the API function is an open function.

At 210, the pointer is stored in a file protected files table and is associated with the logical location of the file.

The steps described hereinafter are performed at run time.

At 214, the operation is waiting for an event related to the data object.

At 215, an event which is related to the data object is received.

At 220, the event is analyzed.

At 225, the type of the event is checked. If the event relates to blocking of a user access to the file then steps 225, 235, 245 and 255 are performed. If the event relates to a request for restoring a file then steps 240, 250 and 260 are performed. Otherwise the operation resumes to 214.

Steps 225, 235, 245 and 255 handle a blocked file; in such a case the file has to be copied to a data repository such as a recycle bin in order to restore the file upon request.

At 225 the logical location of the file is extracted from the event.

At 235, a pointer of the file retrieved from the files protected files table; the retrieving is according to the logical location of the file.

At 245, the data object is accessed and at 255 the data object is copied to a data repository. In some embodiments the data repository is a recycle bin. Other details such as the physical location of the file, the date of creating the file are also retrieved and stored in the data repository.

Steps 240, 250 and 260 handle an operation of restoring a file. Such an operation occurs if a user requests to restore the file.

AT 240 the logical location of the file is extracted from the event-message.

At 250, the file is retrieved from the recycle bin by using the extracted logical location.

At 260, the file is restored from the recycle bin.

Figure 3:
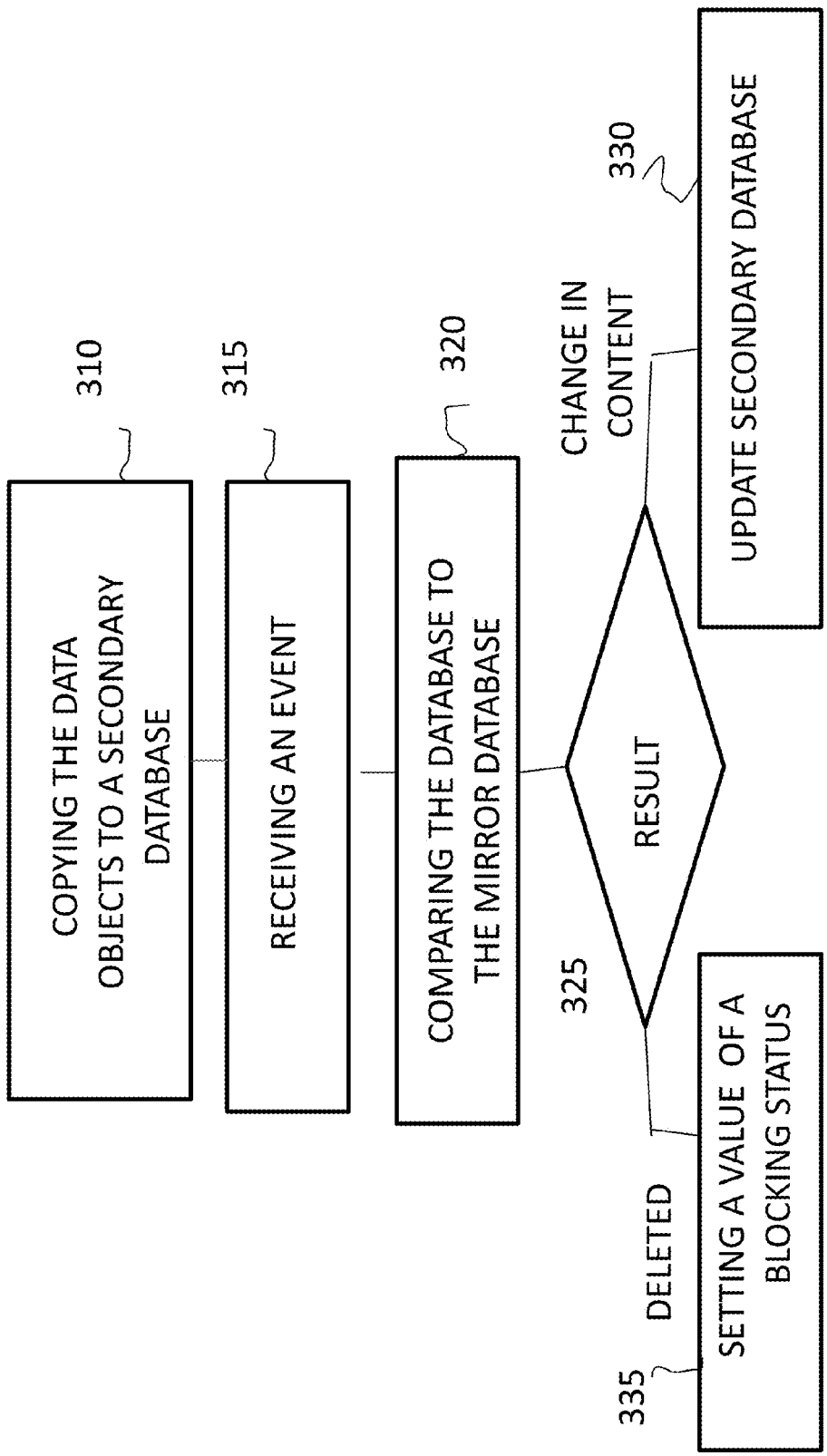
FIG. 3 shows a flowchart diagram of a method for handling a database item, in accordance with some exemplary embodiments of the disclosed subject matter.

FIG. 3 shows a flowchart diagram of a method for handling a database item. According to some embodiments the database item is read from the database in which it is stored and copied to a mirror data object. Upon detecting an event of a change in the database item, the content of the database item is compared to a content of the mirror data object. If the compare operation detects a change in the database item this change is merged into the mirror data object. If the compare operation detects that the database item has been deleted then the mirror data object becomes accessible via a recycle bin in order to enable the user to restore the data object.

At 310 data objects are copied from the database to a secondary database in order to enable the restoring of the data objects in case it is deleted from the database.

At 315 an event indicating a change in the database is received.

At 320 the database is compared to the secondary database in order to identify changes in the database.

At 325 the result of the comparing operation is analyzed.

At 330 which are performed if the result indicates a change to one or more database items, the objects of the secondary database are updated. In some embodiments the history of the changes is also saved in the secondary database in order to enable the restoring to the original data.

At 335 which is performed if the result indicates that a database item was deleted from the database, a value of a status associated with the mirror object of the deleted database item is changed to indicate the deletion. As a result of the change in the status, data related to the database object is displayed in the recycle bin in order to enable a user to restore the data object from the secondary database.

In some embodiments, the application periodically scans the secondary database in order to update the list of deleted data object that is displayed in the recycle bin.

Figure 4:
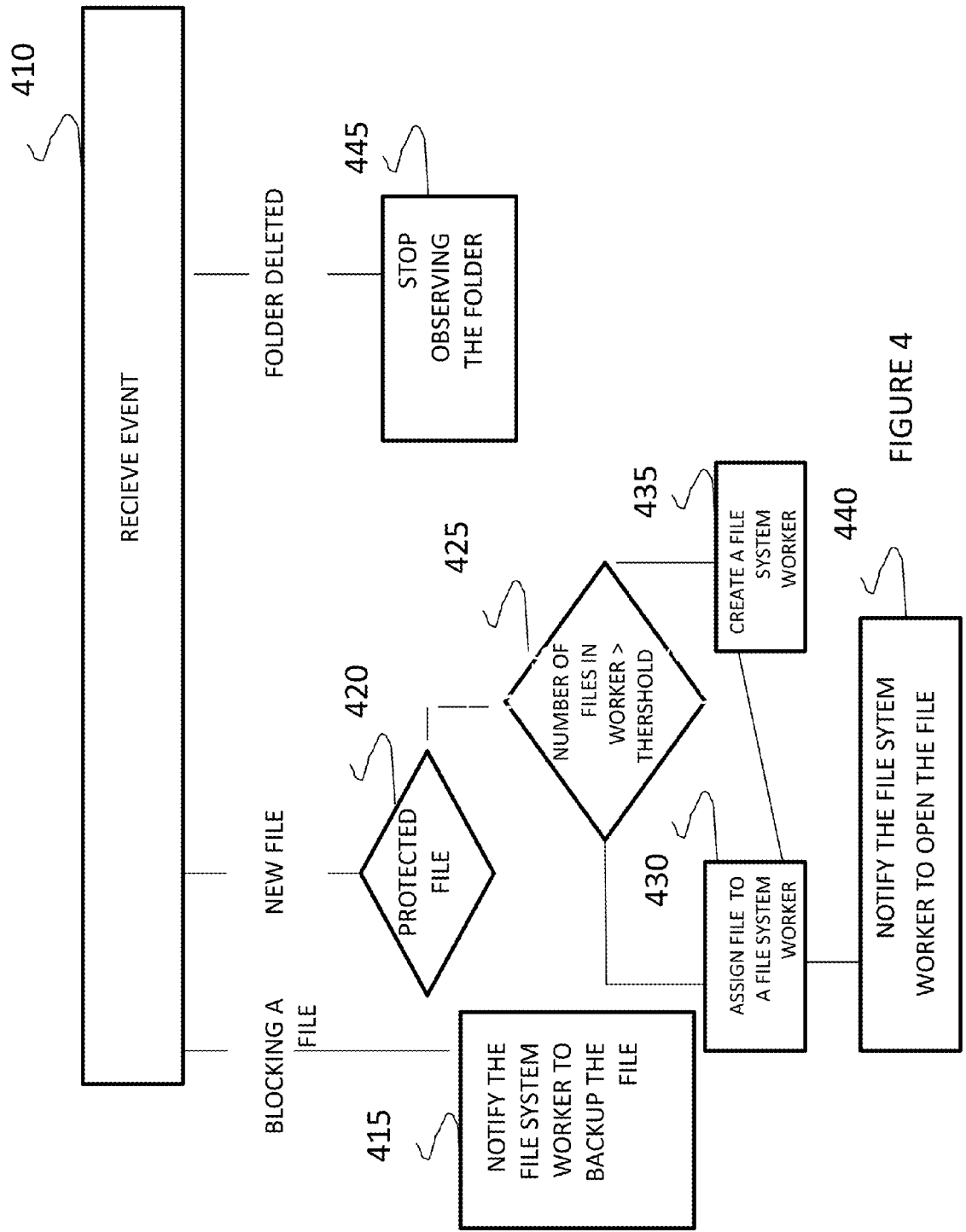
FIG. 4 shows a flowchart diagram of a folder observer.

FIG. 4 shows a flowchart diagram of a folder observer. The folder observer receives events related to the observed folder and the contents of the observed folder. The contents of the observed folder can be files or folders. The events include an event regarding a blocked file, an event regarding a new file, an event regarding a file being moved to a new logical location and an event regarding a deleted folder. The folder observer operates the appropriate command of the file system handler in order to handle the event. The command activates the relevant file system worker. Referring now to the drawing:

At 410 the event is received.

At 415 which is performed if the event indicates a blocking of a user access to a file, the file system worker that is associated with the blocked file is notified. The operation of the file system worker is explained in greater details in FIG. 5.

420, is performed if the event indicates a new file. At 420 the status of the file is checked.

425, 430, 435 and 440 are performed if the file is protected.

At 425 a check is done to see if the number of files associated with each of the existing file system workers exceeds a threshold.

If a threshold is exceeded, then at 430 a new file system worker is created.

At 435, the file is assigned to a file system worker.

At 440, the file system worker to which the file is assigned is notified to open the file and to save the pointer to the file. In some embodiments the pointer to the files are saved in a queue in order to handle a situation in which the number of the handled files in the computerized device exceeds a threshold. In some embodiments the queue is configured for prioritizing the handling of the recently used file. The process of prioritizing the handling of the recently used file is described in greater details in FIG. 14.

Step 445 is performed if a folder is deleted; at 445, the folder observer stops observing the folder.

Figure 5:
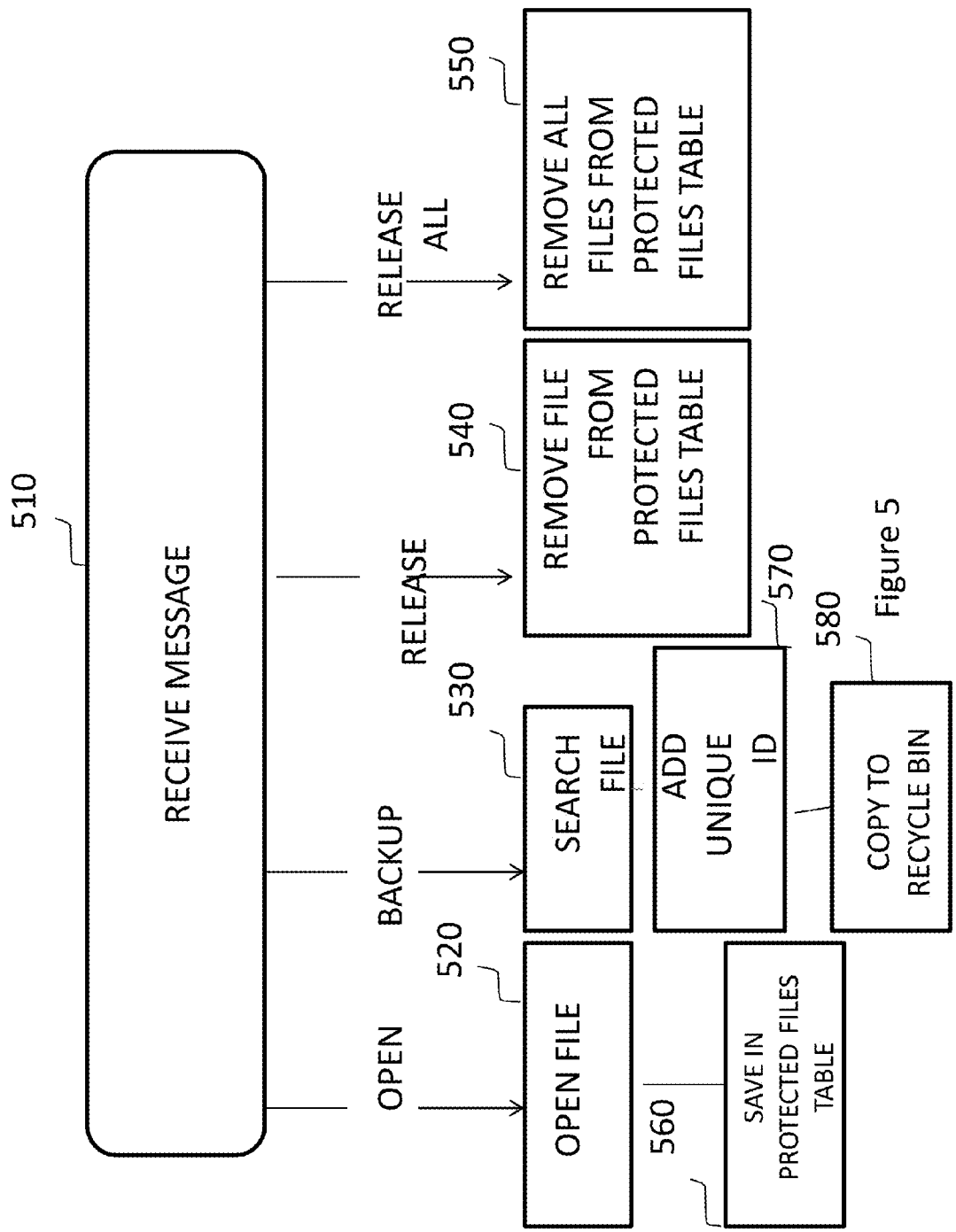
FIG. 5 shows a flowchart diagram of a file system worker.

FIG. 5 shows a flowchart diagram of a file system worker. The file system worker is responsible for copying the file to a recycle bin when the data object is blocked.

At 510 a message designated to the file system worker is received. In some embodiments the message is sent by the file system handler observer.

Steps 520 and 560 are operated if an open message is received. The open message includes the name and the path of the file. The open message is sent upon detecting a new file.

At 520 the file is opened by using the operation system open command.

At 560, the pointer to the file and data related to the file are kept in the protected files table. The data related to the file may include file name, file path, file type and file size.

Steps 530, 570 and 580 are operated as a result of receiving a backup command. The backup command may be sent whenever a file becomes blocked.

At 530 a search is performed in the protected files table in order to find the pointer to the file and the data related to the file.

At 570 a unique identification is assigned to the file. The unique identification is used for distinguishing between files with the same logical location.

At 580, the file's data is copied to the recycle bin with its unique identification.

Step 540 is operated as a result of receiving a release command. The release command may be sent as a result of moving the file from one logical location to another logical location. At 540, the file is removed from the protected files table.

Step 550 is operated as a result of receiving a release all command. At 550, all the files are removed from the protected files table.

Figure 6:
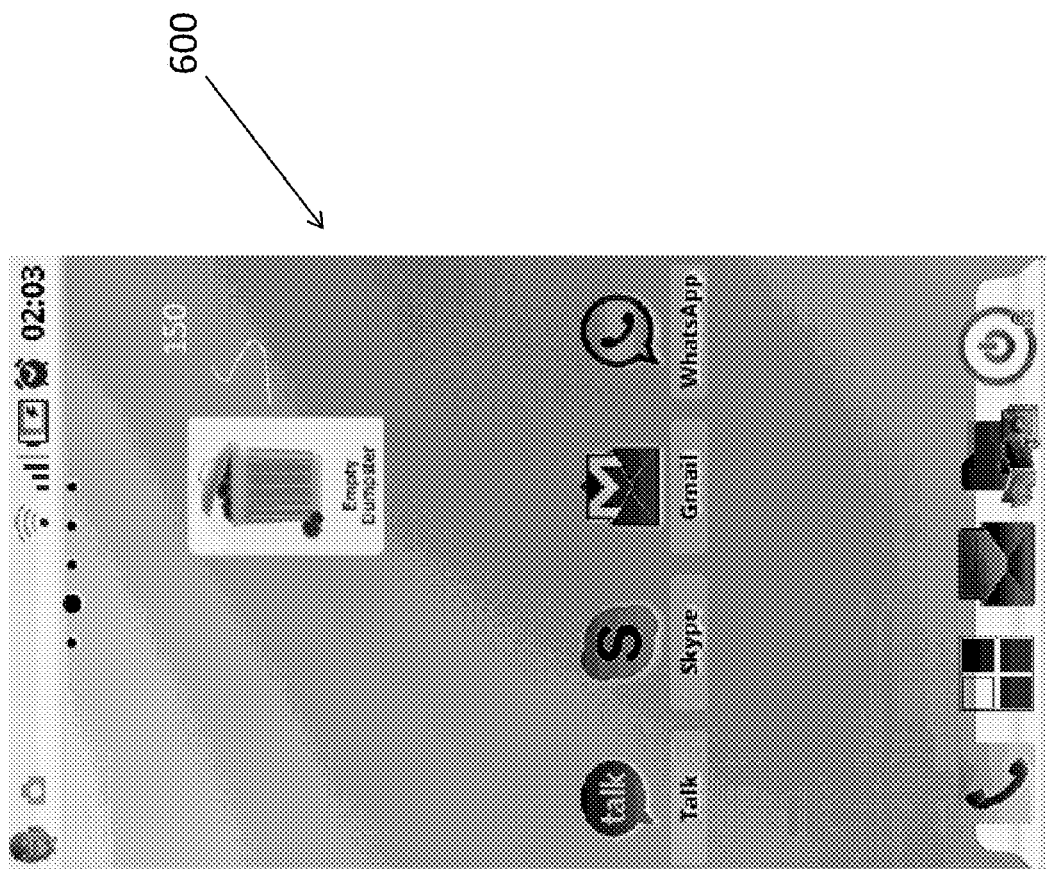
FIG. 6 shows an exemplary desktop of a smart-phone including a recycle bin, in accordance with some exemplary embodiments of the disclosed subject matter.

FIG. 6 shows an exemplary desktop of a smart-phone including a recycle bin, in accordance with some exemplary embodiments of the disclosed subject matter. The icon of the recycle bin 150 is shown on a display 600.

Figure 7:
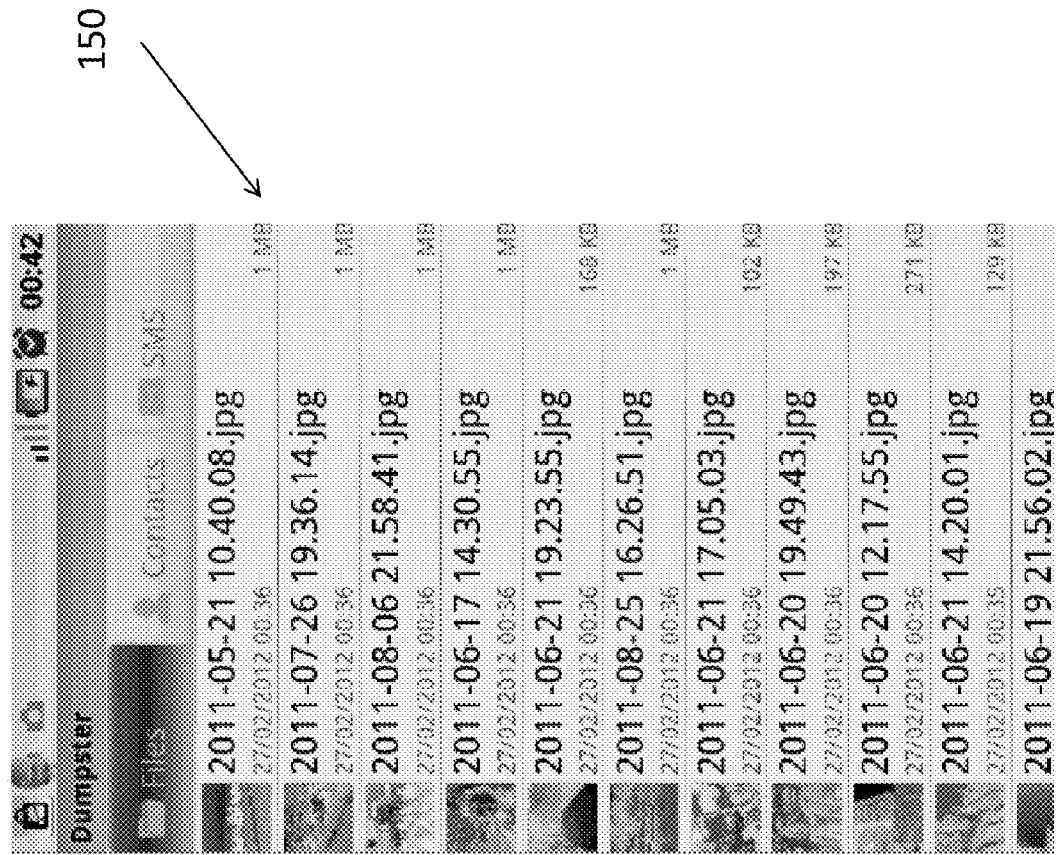
FIG. 7 shows a list of files of an exemplary recycle bin, in accordance with some exemplary embodiments of the disclosed subject matter.

FIG. 7 shows a list of files of an exemplary recycle 150 bin, in accordance with some exemplary embodiments of the disclosed subject matter.

Figure 8:
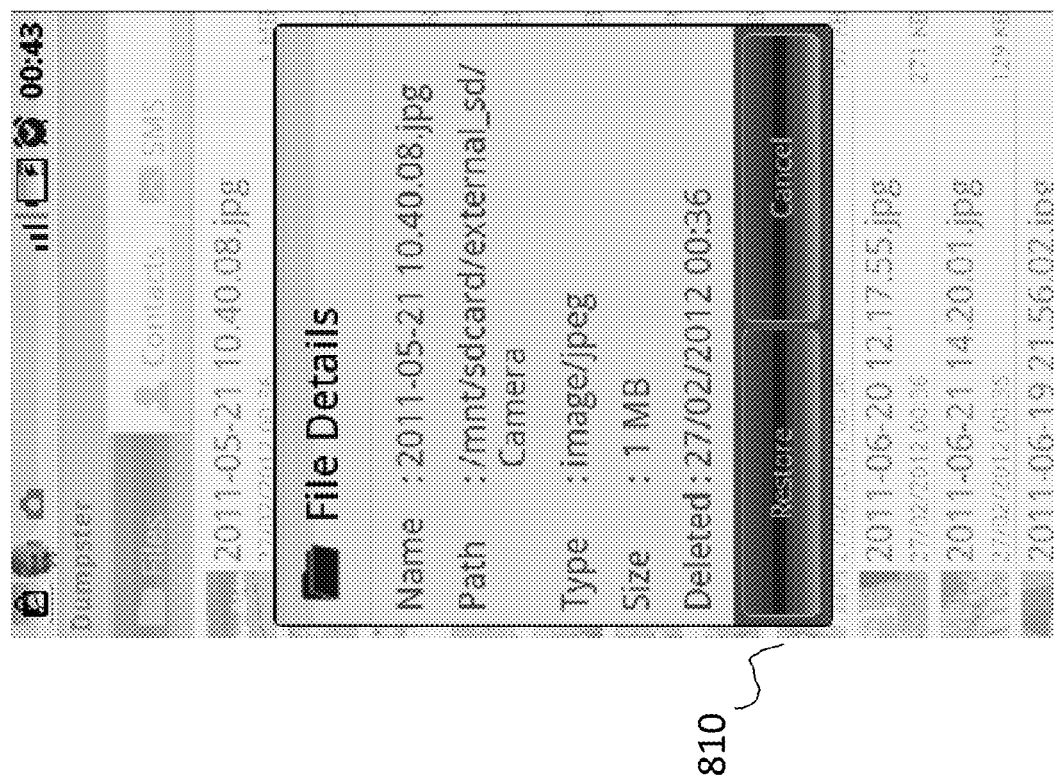
FIG. 8 shows details of a file of an exemplary recycle bin, in accordance with some exemplary embodiments of the disclosed subject matter.

FIG. 8 shows details of a file of an exemplary recycle bin, in accordance with some exemplary embodiments of the disclosed subject matter. The user is provided with the option to restore the file via the restore button 810.

Figure 9:
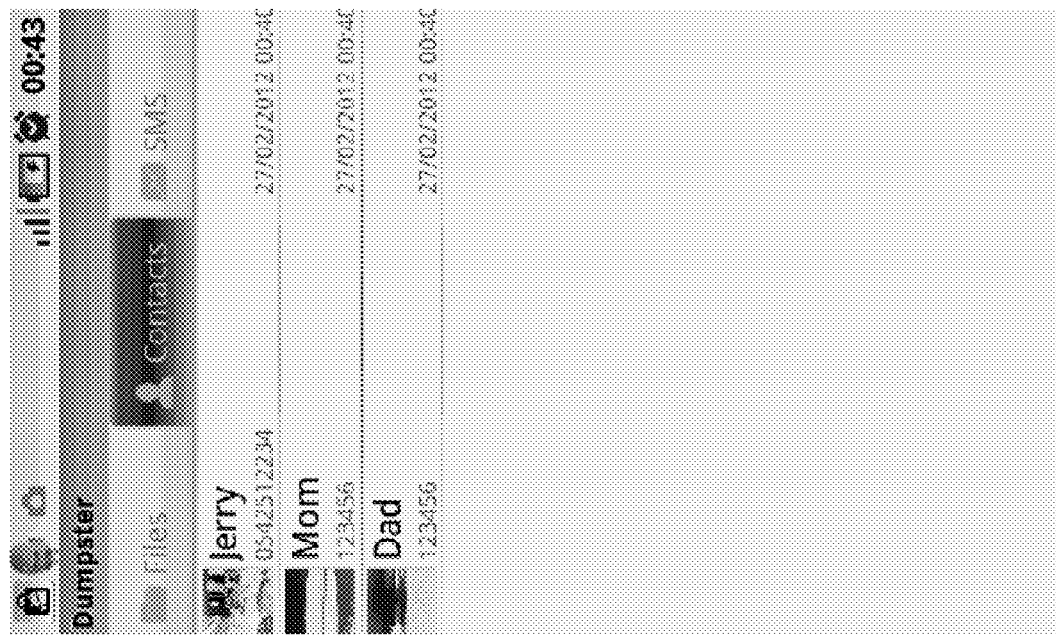
FIG. 9 shows a list of contacts of an exemplary recycle bin, in accordance with some exemplary embodiments of the disclosed subject matter.

FIG. 9 shows a list of contacts of an exemplary recycle bin, in accordance with some exemplary embodiments of the disclosed subject matter.

Figure 10:
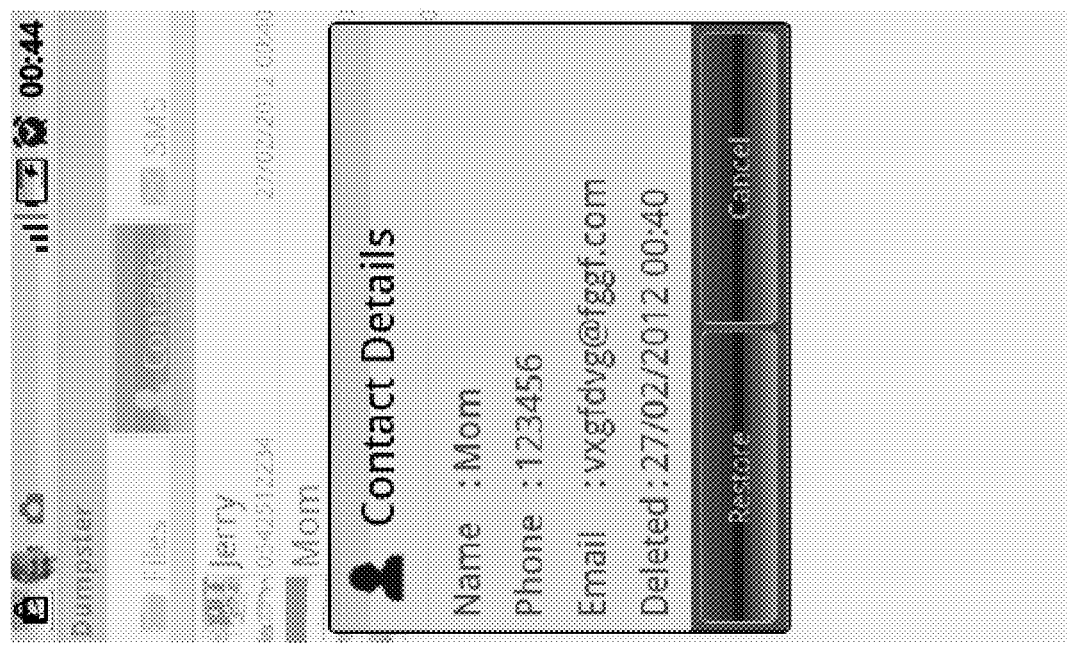
FIG. 10 shows details of a contact of an exemplary recycle bin, in accordance with some exemplary embodiments of the disclosed subject matter.

FIG. 10 shows details of a contact of an exemplary recycle bin, in accordance with some exemplary embodiments of the disclosed subject matter. The user is provided with the option to restore the contact via the restore button 1010.

Figure 11:
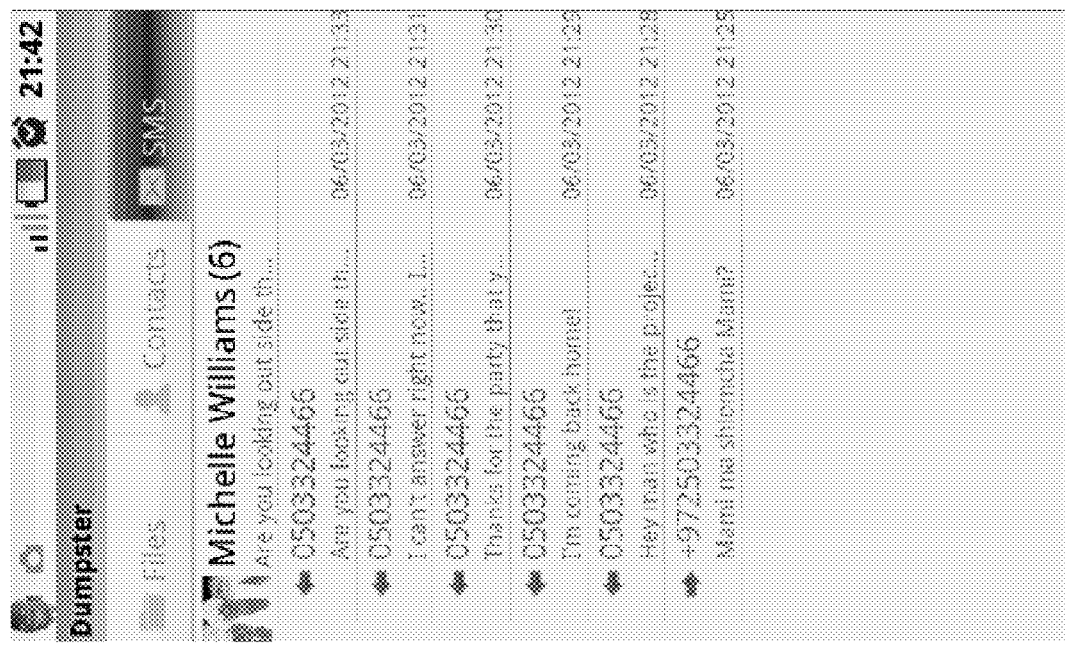
FIG. 11 shows a list of text messages (SMS) of an exemplary recycle bin, in accordance with some exemplary embodiments of the disclosed subject matter.
Figure 12:
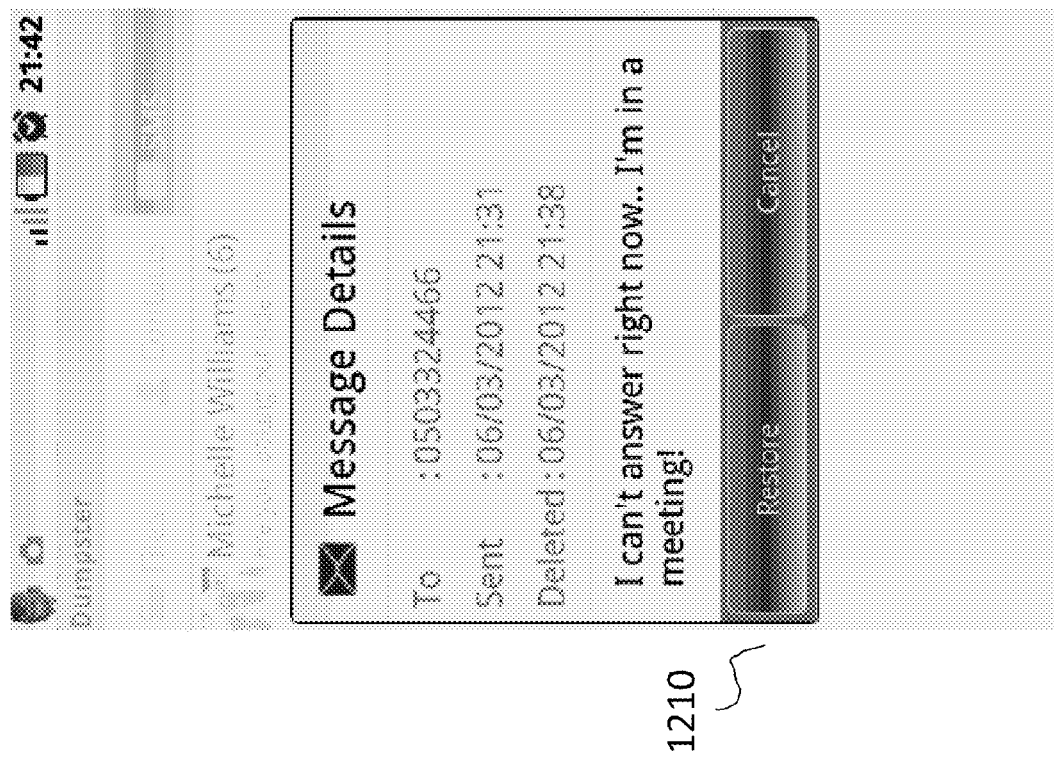
FIG. 12 shows details of a text message (SMS) of an exemplary recycle bin, in accordance with some exemplary embodiments of the disclosed subject matter.

FIG. 11 shows a list of text messages (SMS) of an exemplary recycle bin, in accordance with some exemplary embodiments of the disclosed subject matter;

FIG. 12 shows details of a text message (SMS) of an exemplary recycle bin, in accordance with some exemplary embodiments of the disclosed subject matter. The user is provided with the option to restore the text message via the restore button 1210.

Figure 13:
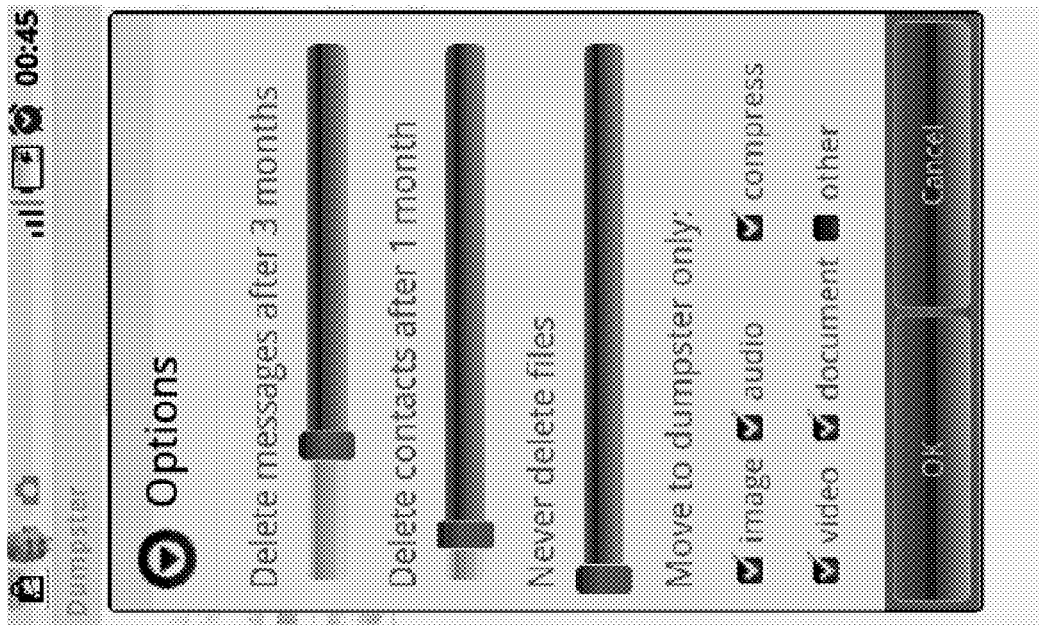
FIG. 13 shows a display of a screen for controlling parameters; in accordance with some exemplary embodiments of the disclosed subject matter.

FIG. 13 shows a display of a screen for controlling parameters; in accordance with some exemplary embodiments of the disclosed subject matter. The user is provided with the option to manage the recycle bin by enabling automatic deletion of files, contacts or text messages (SMS) after a predefined period is elapsed. Additionally the user is provided with the option to define which type of files is protected and which are not protected.

Figure 14A:
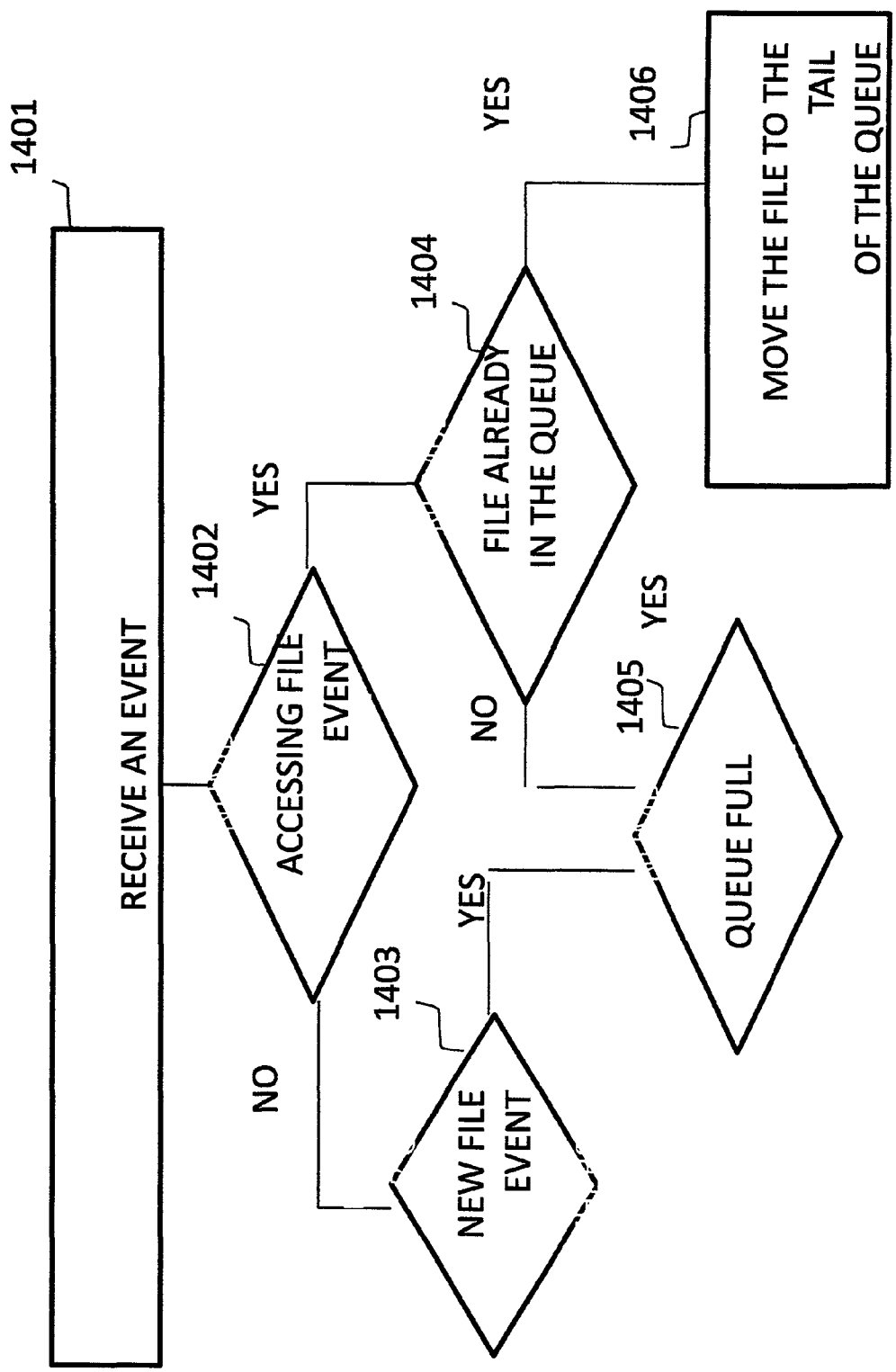
FIGS. 14A and 14B show a flowchart diagram of a method for prioritizing the service of restoring files; in accordance with some exemplary embodiments of the disclosed subject matter
Figure 14B:
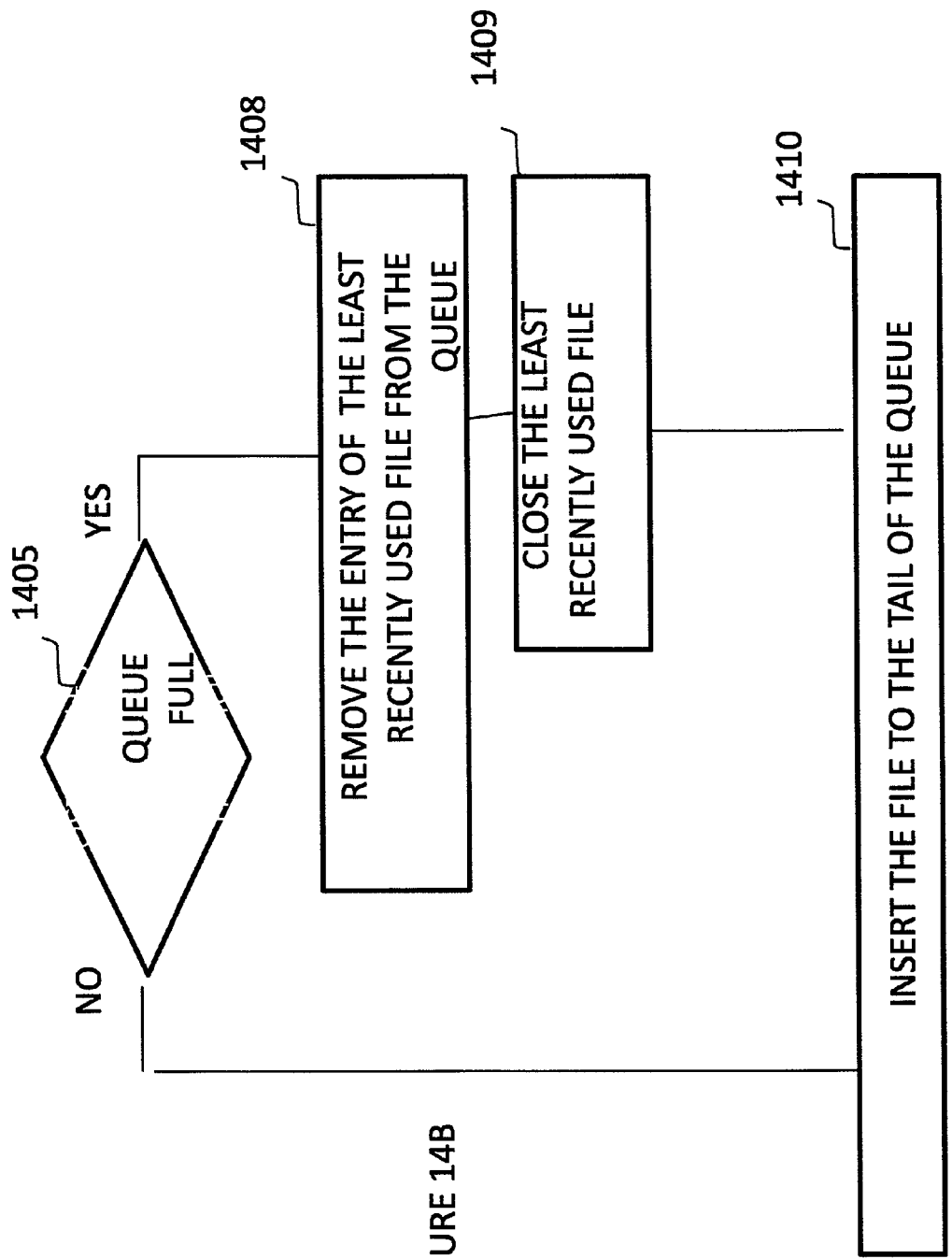

FIGS. 14A and 14B show a flowchart diagram of a method for prioritizing the service for restoring files; in accordance with some exemplary embodiments of the disclosed subject matter. In some environments, the number of opened files is limited. In some embodiments the obtaining of a pointer to a file is based on the opening of the file, thus, there is a need to predict which files may be blocked. In some embodiments the prediction is based on the assumption that the user typically accesses the files before deleting the files. The solution includes a queue, which is ordered according to usage criteria. The number of entries in the queue is limited to the maximum allowable open files. When a file is accessed or is generated, the pointer to the file is saved in the tail of the queue, if the pointer to the file is already in the queue, the pointer of the file is moved to the tail of the queue. If the pointer to the file does not exist in the queue and the queue is full, the pointer that is located at the head of the queue (pointer of the least recently used file) is released from the queue in order to enable the insertion of the pointer of the current file. In some embodiments the queue is operated only when the number of opened files exceeds a threshold. In some embodiments the operation is performed on each file of a directory when accessing a directory and on other files from a directory of an accessed file. Referring now to the drawing:

At 1401 an event is received.

At 1402 a check is performed to find out if the event relates to an operation of accessing a file. Examples of such operation is viewing a file and selecting a file.

At 1403 which is performed if the event does not relate to an operation of accessing a file, a check is performed to find out if the event is related to an operation of generating a new file.

If the operation relates to generating a new file, then the process proceeds to 1405.

At 1404 which is performed if the event relates to the operation of accessing a file or a directory in which the file exists, a check is performed to find out if the pointer of the file is already in the queue.

If the pointer of the file is already in the queue then, at 1406, the pointer of the file is moved to the tail of the queue providing this file the highest priority.

At 1405, which is performed if the event is a new file event or if the event is accessing file event and the file not in the queue, a check is performed to find out if the queue is full.

If the queue is full (if a length of the queue exceeds a threshold) then at 1408 the least recently used entry is removed from the head of the queue and, at 1409, the least recently used file is closed, thus maintaining a balance of the number of open files that are served by the system.

At 1410 which is operated if the queue is not full or after removing the pointer of the least recently used file from the queue, the pointer of the current file is inserted to the tail of the queue.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

What is claimed is:

1. At a computer device configured for operating an operating system a method for handling a data object; the method comprising:
    operating an open function on said data object and receiving a pointer associated with a physical address of said data object, said operating being for providing access to said data object when said data object is deleted, said open function being a function of said operating system;
    monitoring said data object for detecting said deletion activity;
    receiving an event indicating said deletion activity;
    in response to said event, utilizing said pointer for accessing said physical address of said data object; and
    copying said data object from said physical address to a recycle bin, wherein said copying is only performed in response to said event; thereby enabling efficient restoring of said deleted data object.

2. The method of claim 1, further comprising the step of restoring said data object from said recycle bin.

3. The method of claim 1; wherein said data object is a file.

4. A non-transitory computer-readable storage medium storing instructions, the instructions causing the processor to perform:
    operating an open function on said data object and receiving a pointer associated with a physical address of said data object, said operating being for providing access to said data object when said data object is deleted;
    monitoring said data object for detecting said deletion activity;
    receiving an event indicating said deletion activity;
    in response to said event, utilizing said pointer for accessing said physical address of said data object; and
    copying said data object from said physical address to a recycle bin, wherein said copying is only performed in response to said event; thereby enabling efficient restoring of said deleted data object.

* * * * *